United States Patent [19]
Nakazawa et al.

[11] Patent Number: 4,757,970
[45] Date of Patent: Jul. 19, 1988

[54] BALANCING MECHANISM IN PEDESTAL CARRYING TELEVISION CAMERA

[75] Inventors: Shoji Nakazawa, Kamakura; Naoki Ebimoto, Yokohama, both of Japan

[73] Assignee: Shotoku Ltd., Japan

[21] Appl. No.: 21,578

[22] Filed: Mar. 2, 1987

Related U.S. Application Data

[63] Continuation of Ser. No. 735,186, May 17, 1985, abandoned.

[51] Int. Cl.⁴ .............................................. F16M 11/00
[52] U.S. Cl. .................................. 248/571; 248/123.1; 248/297.1; 248/178; 248/584; 267/156; 352/243; 354/293
[58] Field of Search ............... 248/571, 572, 123.1, 248/297.1, 178, 182, 607, 587, 584, 563, 561; 267/59, 156; 108/136, 146, 147, 144; 352/243; 354/293

[56] References Cited

U.S. PATENT DOCUMENTS

| 695,001 | 3/1902 | Sharp | 182/237 |
|---|---|---|---|
| 2,073,998 | 3/1937 | Raby | 248/587 |
| 2,299,251 | 10/1942 | Perbal | 248/571 |
| 2,840,333 | 6/1958 | Weaver | 248/602 |
| 3,003,737 | 10/1961 | Mehr | 248/571 |
| 3,033,316 | 5/1962 | Foster | 267/156 X |
| 3,151,704 | 10/1964 | Clarke | 267/156 X |
| 3,154,280 | 10/1964 | Wiese | 248/571 |
| 3,622,111 | 11/1971 | Nissen | 248/571 |
| 3,890,907 | 6/1975 | Peterson | 248/571 |
| 3,895,770 | 7/1975 | Yoshida | 248/584 |
| 4,447,033 | 5/1984 | Jaumann | 248/563 |
| 4,478,313 | 10/1984 | Wakase | 267/156 X |

FOREIGN PATENT DOCUMENTS 1127052 4/1962 Fed. Rep. of Germany ... 248/123.1
2717772 10/1978 Fed. Rep. of Germany .

Primary Examiner—Alvin C. Chin-Shue
Attorney, Agent, or Firm—Franklin D. Wolffe; Morris Fidelman

[57] ABSTRACT

A pedestal carrying a television camera and its accessories has constant-torque springs which are housed in a detachable housing. The output shaft of each constant-torque spring is made responsive to the weight of the camera and its accessories, and is connected via a reduction mechanism with a mechanism for winding up a line such as wire.

4 Claims, 3 Drawing Sheets

BALANCING MECHANISM IN PEDESTAL CARRYING TELEVISION CAMERA

This application is a continuation, of application Ser. No. 735,186, filed May 17, 1985 now abandoned.

FIELD OF THE INVENTION

The present invention relates to improvements in a pedestal which carries a television camera and other components to permit it to take pictures while it is in motion. More specifically, it relates to improvements in a vertically adjustable balancing mechanism having a constant-torque spring mechanism which is specifically designed to readily and certainly balance the whole weight of a television camera system itself, including a lens, its accessories, and components carried on it, via a wire winder in response to the weight and to bring the camera to a standstill at a desired height with accuracy.

BACKGROUND OF THE INVENTION

As well known in the prior art, in the conventional pedestal, the weight of a camera and other components is made to balance itself in response to constant-load springs. Since the output of such a known constant-load spring is constant, the number of the constant-load springs is required to correspond to the weight. Further, because the body and accessories of a camera or the like carried on the pedestal weigh as heavy as about 100 Kg in total, and because the life of the constant-load springs, which are usually 20 to 40 in number, ends after the usage of approximately 10,000 cycles, the present situation is that they are all replaced with others within six months to one year. These springs are fixed to a bottom plate and received there, and have an intensity of 4 to 5 Kg. Therefore, when the springs are replaced, the operation is performed against the action of these strong springs, hence involving skillfulness and danger. As such, it is not easy to do. Furthermore, since these constant-load springs have a considerable width because of their shape, and since the elongation of the springs requires a space that is within the stroke of a vertically moving pedestal, a space in which 20 to 40 constant-load springs move is normally needed, necessarily making the system large.

SUMMARY OF THE INVENTION

It is an object of the present invention to provide a small pedestal.

It is another object of the invention to provide a pedestal having springs which are most susceptible to damage and which can be easily replaced.

It is a further object of the invention to provide a pedestal having constant-torque springs to which a less weight of camera and other components is applied, whereby the springs can be used over a prolonged term.

Other objects and features of the invention wil appear in the course of the description thereof which follows.

DETAILED DESCRIPTION OF THE INVENTION

Figure 1:
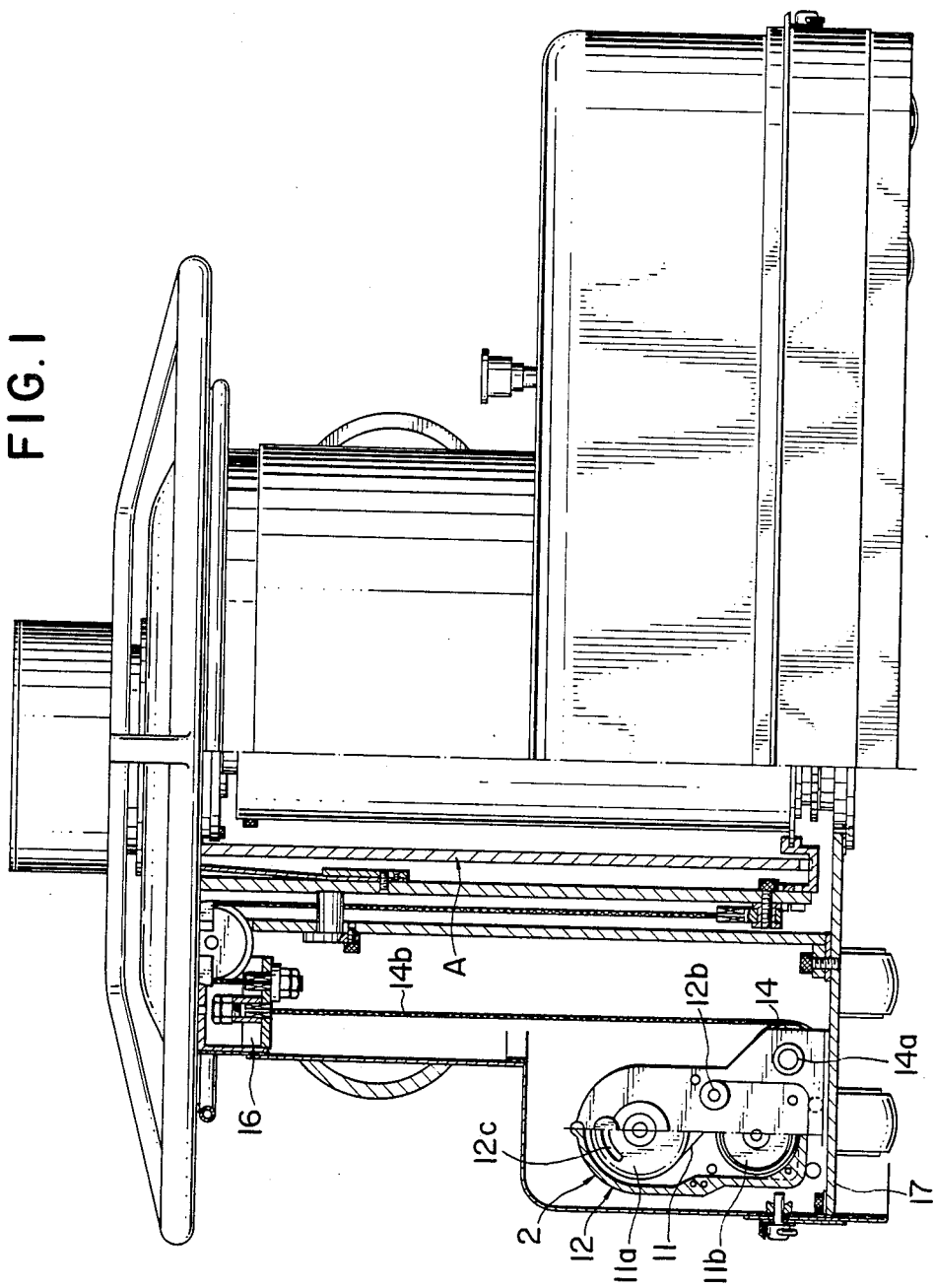
FIG. 1 is a front elevation in longitudinal cross section of a portion of a two-stage pedestal according to the present invention.
Figure 2:
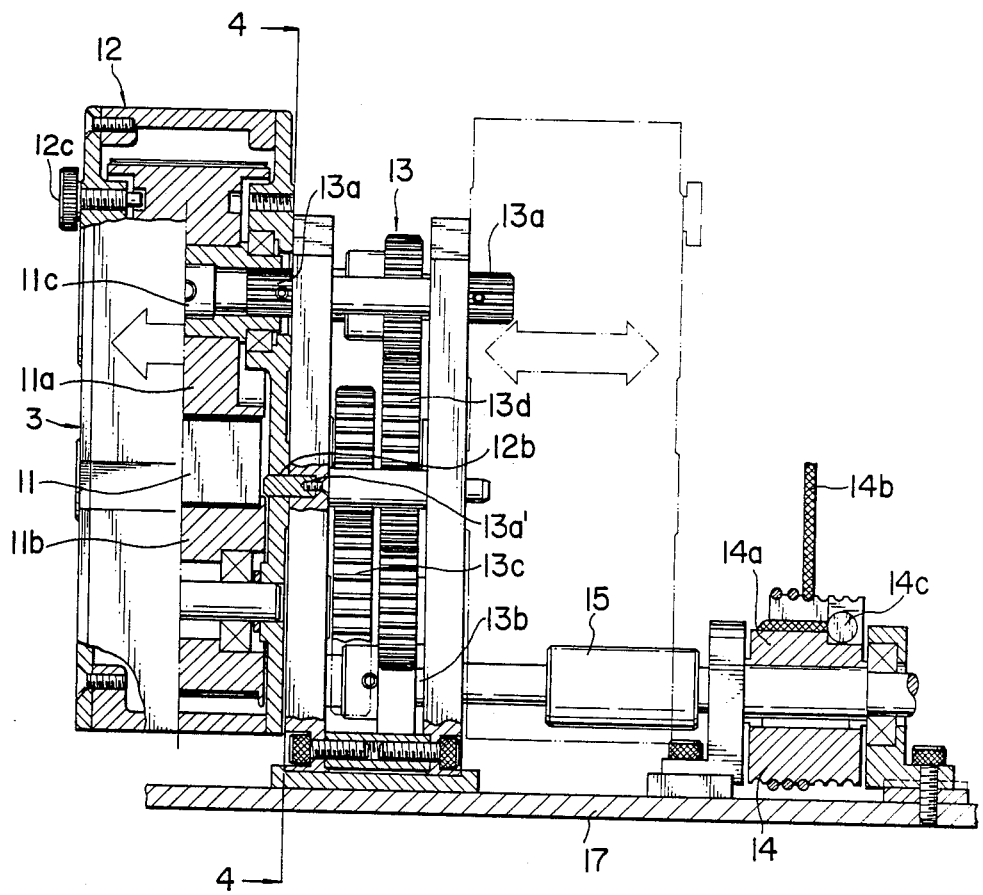
FIG. 2 is a fragmentary, enlarged longitudinal cross section taken along the arrow 2 in FIG. 1.
Figure 3:
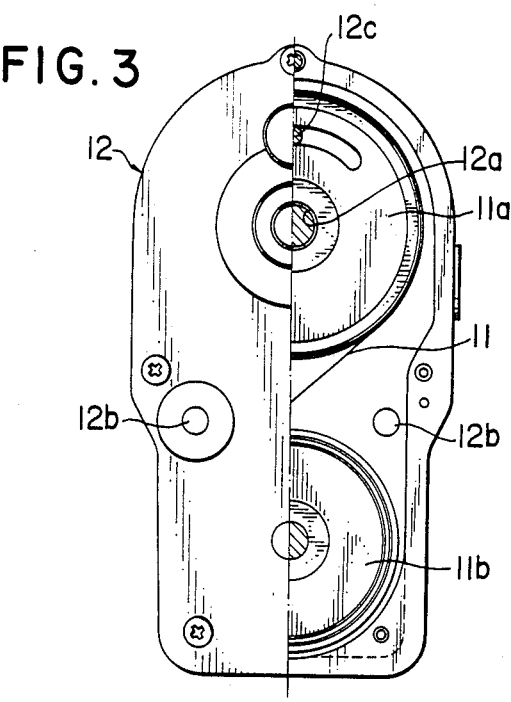
FIG. 3 is a fragmentary longitudinal cross section taken in the direction indicated by the arrows in FIG. 2, for showing the inside of a housing receiving constant-torque springs.
Figure 4:
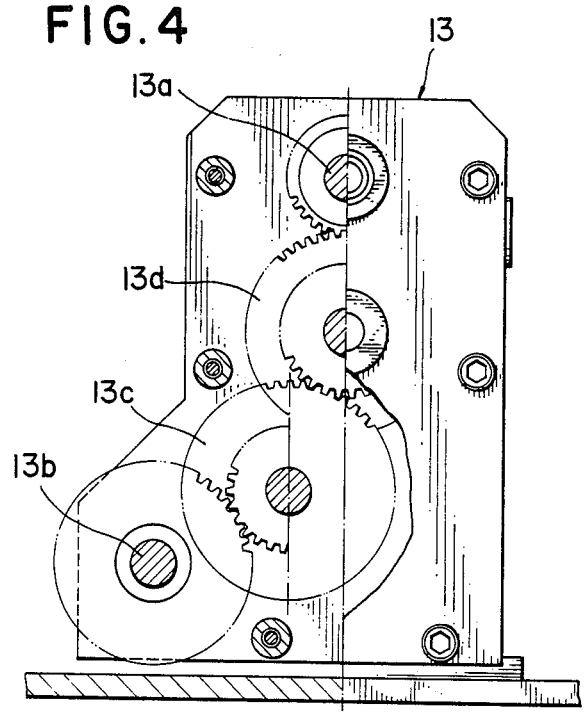
FIG. 4 is a fragmentary longitudinal cross section taken in the direction indicated by the line 4—4 in FIG. 2, for showing the balance of a reduction mechanism.

Referring to the drawings, there is shown a pedestal embodying the concept of the present invention. This pedestal has constant-torque springs 11 each made of a leaf spring that, in the illustrated example, has been shaped with a constant curvature throughout its whole length, each spring taking the form of a coil when no load is applied to it. One end of the spring is wound on a drum 11a at the output side, while the other end is wound on another drum 11b in the opposite direction. Since the tension produced by the restoring force of the coil is constant, a constant torque is shown to be applied to the output. The constant-torque spring is housed in a housing 12, which is provided with an output shaft hole 12a, installation holes 12b, and a stopper 12c. The output shaft of the drum 11a is fitted in a hole 11c. In order to interlock the spring 11 with a reduction mechanism 13, the output shaft hole 12a is with splines provided for interlocking the output shaft in the hole 11c with the input shaft 13a of the reduction mechanism 13. This mechanism 13 has fixed pins 13a' fitted in the installation hole 12b. When the reduction mechanism 13 is detachably mounted to the housing 12, the input shaft 13a of the mechanism 13 is inserted into the output shaft hole 12a, and the pins 13a' are inserted into the holes 12b. Before a component is replaced with another, the operation of the spring 11 is stopped. The stopper 12c is provided for the spring 11.

In this specific example, the reduction mechanism 13 has four reduction gearings between the input shaft 13a and the output shaft 13b, as well as gears 13c, 13d. The invention is not limited to this arrangement. For example, other reduction mechanisms (not shown) employing a belt pulley, chain gearing, or wire-pulley transmission may also be used. A mechanism 14 for winding a line such as wire has its shaft 14a coupled via a coupling 15 to the output shaft 13b of the reduction mechanism 13. A line 14b such as wire is connected with a connector 16 of an elevator A. One end of the line is held by a retainer 14c. The reduction mechanism 13 and the winding mechanism 14 are mounted on a base 17.

As already described, the output shaft of the constant-torque spring is made responsive to the weight of the camera and other components, and therefore the output of the spring is converted into a torque responsive to the weight. The spring can retain an output that is about twice as large as the output delivered by a conventional constant-load spring system.

Also, according to the invention, the constant-torque spring is received in the cassette type of housing that is detachable. Therefore, in assembling the pedestal, the spring can be installed simply by mounting the housing. Also, when the spring must be replaced with another because of damage or for other reason, a new spring can be installed simply by detaching and mounting the housing. In addition, since the reduction mechanism is connected to the output shaft of the constant-torque spring, the weight of the camera and other components is applied to the output shaft of the spring via the reduction mechanism. Hence, the weight that the spring must sustain is the weight of the camera and other components decreased by the reduction gear ratio of the reduction mechanism. Furthermore, as the output shaft of the constant-torque spring is interlocked with the mechanism for winding up a line such as wire, the weight of the camera and other components is applied to the output of the spring by way of the winding mechanism. Thus, the tension on the wire can be increased by, for example, reducing the radius of the winding drum of the winding mechanism. Still further, the reduction mechanism is connected with the output shaft of the constant-torque spring, and the mechanism for winding up a line such as wire is interlocked with the reduction mechanism. Consequently, the weight of the camera and other components is applied to the output shaft of the spring via the winding mechanism and the reduction mechanism. The tension obtained by the winding mechanism is transmitted to the output shaft of the spring after being reduced by the reduction gear ratio of the reduction mechanism.

In this way, according to the invention, the output shaft of the constant-torque spring is made responsive to the weight of a camera and other components. Hence, under the same conditions, the constant-torque spring delivers a torque that is about two or more times as large as the torque delivered by a conventional constant-load spring. As such, the twenty to fourty constant-load springs which have been heretofore required can be roughly halved or further reduced in number. This can contribute to a substantial miniaturization of the pedestal itself. Also, since the constant-torque spring is received in the housing that is detachable, when the spring is manufactured or it is detached for repairment or for other reason, the spring can be detached simply by detaching the housing. Hence, skillfulness and danger which were involved in detaching the aforementioned conventional constant-load spring can be made unnecessary and avoided. Further, because the weight of a camera and other components is applied to the output shaft of the constant-torque spring via the reduction mechanism, the weight is reduced by the reduction mechanism. Additionally, the output torque can be decreased by the constant-torque spring. Furthermore, the interlocking with the reduction mechanism further reduces the number of constant-torque springs. Yet further, under the same conditions including the weight, the novel pedestal using a half or less number of constant-torque springs yields the same advantage as the conventional pedestal using constant-load springs. This permits the novel pedestal to be manufactured in smaller size. In the conventional constant-load spring system, two or more constant-load springs must be balanced with each other, restricting the location at which it is located. In contrast, according to the invention, the pedestal can be installed at any desired position, because the mechanism for winding up wire or the like is interlocked with the output shaft of the constant-torque spring, and because the wire is wound up by the drum. Therefore, a pulley or the like can be used for the intermediate wire. This feature combines with the usage of the constant-torque springs to miniaturize the pedestal. In this manner, the novel pedestal enjoys various advantages.

What is claimed is:

1. In a device providing a pedestal-type support for objects of variable weight, said support being extensible and have a spring means operatively associated therewith in order to balance said weight when said pedestal is extended, the improvement comprising:
   a cassette housing substantially enclosing a spring of said spring means, said cassette housing being readily detachable from said device in order to provide for ease of assembly of said spring with and disassembly of said spring from operative engagement with said device and including an internally splined recess by which said spring means is driveably attachable to said pedestal-type support; and
   said spring means comprising at least one constant torque spring such that balancing of said weight is provided throughout complete extension of said support.

2. The improvement as in claim 1, said weight balancing means further comprising:
   a reduction mechanism operatively associated with said spring and support in order to provide for a mechanical advantage and ease of connection and disconnection of said spring with said support.

3. The improvement as in claim 1, and further comprising:
   a line and reel operatively associated with said spring and said support in order to convert an output torque of said spring into a linear force for balancing said weight.

4. In a device providing a pedestal-type support for objects of variable weight, said support being extensible and have a spring means operatively associated therewith in order to balance said weight when said pedestal is extended, the improvement comprising:
   a cassette housing substantially enclosing a spring of said spring means, said cassette housing being readily detachable from said device in order to provide for ease of assembly of said spring with and disassembly of said spring from operative engagement with said device; and
   means in said cassette housing for releasably retaining and maintaining a selected energy stored in said spring during said assembly and disassembly.

* * * * *